(12) United States Patent
Kaptelinin

(10) Patent No.: US 12,224,876 B2
(45) Date of Patent: Feb. 11, 2025

(54) PERSISTENT SUBGROUPS IN ONLINE MEETINGS

(71) Applicant: Viktor Kaptelinin, Hornefors (SE)

(72) Inventor: Viktor Kaptelinin, Hornefors (SE)

( * ) Notice: Subject to any disclaimer, the term of this patent is extended or adjusted under 35 U.S.C. 154(b) by 0 days.

(21) Appl. No.: 18/370,293

(22) Filed: Sep. 19, 2023

(65) Prior Publication Data
US 2024/0097928 A1 Mar. 21, 2024

Related U.S. Application Data

(60) Provisional application No. 63/407,874, filed on Sep. 19, 2022.

(51) Int. Cl.
*H04L 12/18* (2006.01)

(52) U.S. Cl.
CPC ................ *H04L 12/1822* (2013.01)

(58) Field of Classification Search
CPC .................. H04L 12/1822; H04L 12/1818
USPC ........................................................ 709/204
See application file for complete search history.

(56) References Cited

U.S. PATENT DOCUMENTS

| | | | |
|---|---|---|---|
| 11,323,493 B1 * | 5/2022 | Xi | H04M 3/42348 |
| 11,343,293 B1 * | 5/2022 | Slotznick | H04N 5/272 |
| 11,526,669 B1 * | 12/2022 | Werner | G06F 3/04842 |
| 11,562,657 B1 * | 1/2023 | Fieldman | G09B 5/14 |
| 2017/0093936 A1 * | 3/2017 | Lau | H04M 3/564 |
| 2018/0375676 A1 * | 12/2018 | Bader-Natal | H04L 65/403 |
| 2019/0088153 A1 * | 3/2019 | Bader-Natal | H04N 7/147 |
| 2021/0373676 A1 * | 12/2021 | Jorasch | G06F 3/038 |
| 2021/0399912 A1 * | 12/2021 | Stewart | H04N 7/15 |
| 2022/0417049 A1 * | 12/2022 | Decrop | H04L 12/1818 |

* cited by examiner

*Primary Examiner* — Ruolei Zong

(57) ABSTRACT

The present invention provides methods and software for facilitating coordination among participants in an online meeting. The invention enables participants to transition between a general discussion, involving all participants, and small-group discussions. In one embodiment, subgroup members are supported in acting as a unified group during the general discussion. In another embodiment, the division of participants into subgroups is maintained when transitioning between general discussions and small-group discussions.

14 Claims, 2 Drawing Sheets

PERSISTENT SUBGROUPS IN ONLINE MEETINGS

CROSS-REFERENCE TO RELATED APPLICATIONS

The present application claims the benefit of provisional U.S. Patent Application Ser. No. 63/407,874, filed Sep. 19, 2022, with title "FLOOR MANAGEMENT IN REMOTE MEETINGS" and naming Viktor Kaptelinin as inventor.

BACKGROUND OF THE INVENTION

This invention relates to electronic systems and their interfaces. More specifically, it relates to information technologies that enable communication between several participants connected to each other through a computer network.

In our days, meetings of many types, such as committee meetings, project meetings, university classes, and so forth, take place online rather than in a shared physical space. The participants, connected to one another through a network, e.g., the internet, and using a remote collaboration technology, e.g., a videoconferencing system, are present in a shared communication space, in which they may talk to each other, see each other, send text messages to each other, share images and files, have discussions, give presentations, or ask questions.

The terms "online meeting", "videoconference session", and "virtual meeting", are used here interchangeably.

Some online meetings may combine general discussions, at which all meeting participants are present in the common communication space, with small-group discussions (or "breakout room discussions"), at which some or all of the meeting participants form subgroups and have discussions in their respective subgroups' communication spaces (a subgroup is a group comprising a subset of all participants in a meeting). For instance, a group of students may attend a lecture given to the entire class in the common communication space, then the class is divided into several subgroups, and the subgroups have separate small-group discussions in their respective subgroup communication spaces, and finally all meeting participants reconvene in the common communication space to have a general discussion.

A potential problem with switching between a general discussion and small-group discussions in online meetings is that such switching may be disruptive for the participants. For instance, if subgroups of students have their small-group discussions and then move to the common communication space to present their group work to the entire class, they will need to work as a group even after joining the general discussion, but they might find it difficult to do so because the small-group communication context may be lost at that point. The present invention addresses this problem.

SUMMARY OF THE INVENTION

A method is provided for supporting participants in an online meeting to coordinate their participation in a general discussion, involving all meeting participants, and participation in small-group discussions. According to the preferred embodiment of the invention, members of a subgroup are supported in acting as one group both during a general discussion, involving all meeting participants, and small-group discussions (e.g., discussions in breakout rooms). A division of meeting participants into subgroups is generally preserved when switching from small group discussions to a general discussion and from a general discussion to small group discussions.

According to an embodiment of the invention, a method is provided for supporting a plurality of users using a plurality of electronic devices to engage in an online meeting, wherein each device in said plurality of devices comprises at least a processor, a display displaying an at least a display window displaying meeting-related information, a microphone, and preferably a video camera configured to be able to capture an image of a device user, wherein said plurality of devices are connected via a communication network to one another and preferably to a network server or servers, wherein all meeting participants are taking part in a general discussion (are present in the same communication space, in which meeting participants having a conversational floor are addressing all other participants in said meeting); the method comprising the method steps of detecting a user action performed by a user from said plurality of users, said user action being a request for dividing said plurality users including all meeting participants into a set of non-overlapping subgroups according to predefined parameters included is said requesting user action; wherein said parameters include at least a parameter selected from a group comprising at least: number of subgroups, size or sizes of subgroups, names of subgroups, list of persons to be included in a subgroup, and whether or not said meeting participants can a subgroup to join; and displaying, in said display window, visual cues indicating which meeting participants are placed in which subgroups; and enabling meeting participants to perform at least a user action selected from a set comprising at least: requesting a conversational floor for giving presentation as a subgroup, muting/unmuting a subgroup, sharing screen within a subgroup, sending messages to members of own subgroup, sending messages to other meeting participants on behalf of a subgroup;

wherein said meeting participants, divided into said subgroups, remain in said common communication space.

According to some variations of the embodiment of the invention, the method additionally includes:

placing visual representations of members of a subgroup in a substantially same area of said display window, and wherein said visual cues are adapted to make said window area visually distinct, allowing a subgroup's members, when the subgroup is muted during a general discussion, to talk to other members of said subgroup without being heard by meeting participants, who do not belong to said subgroup, allowing a subgroup's members, when having a small-group discussion to talk to other members of said subgroup without being heard by meeting participants, who do not belong to said subgroup, allowing a subgroup's members, when having a small-group discussion, to choose whether or not to (a) share video images of subgroup members, (b) show other groups images selected by said subgroup members, and (c) having an overview of other subgroups as said other subgroups are engaged in small group discussions.

DETAILED DESCRIPTION OF THE INVENTION

FIGS. 1a-1d present a schematic view of an application window according to the preferred embodiment of the invention. The application window is a window shown on a display of a device from a plurality of devices, used by a plurality of users engaged in an online meeting. The device, in addition to the display, displaying the window displaying meeting-related information, comprises a processor, a microphone, and a video camera configured to be able to capture an image of a device use (not shown). The devices comprising the plurality of devices are connected via a communication network to one another and to a network server or servers. All meeting participants are taking part in a general discussion (are present in the same communication space, in which meeting participants having a conversational floor are addressing all other participants in said meeting). FIG. 1 a shows window 100 after a user action, which requested dividing meeting participants into two non-overlapping subgroups, Group A and Group B, each comprising two participants.

When the user action was detected, the window displayed images of the participants in each group in rectangular areas 170 and 180, corresponding to the subgroups. Even though the participants are divided into the subgroups, the participants continue to take part in the general discussion, involving all meeting participants.

Figure 1A:
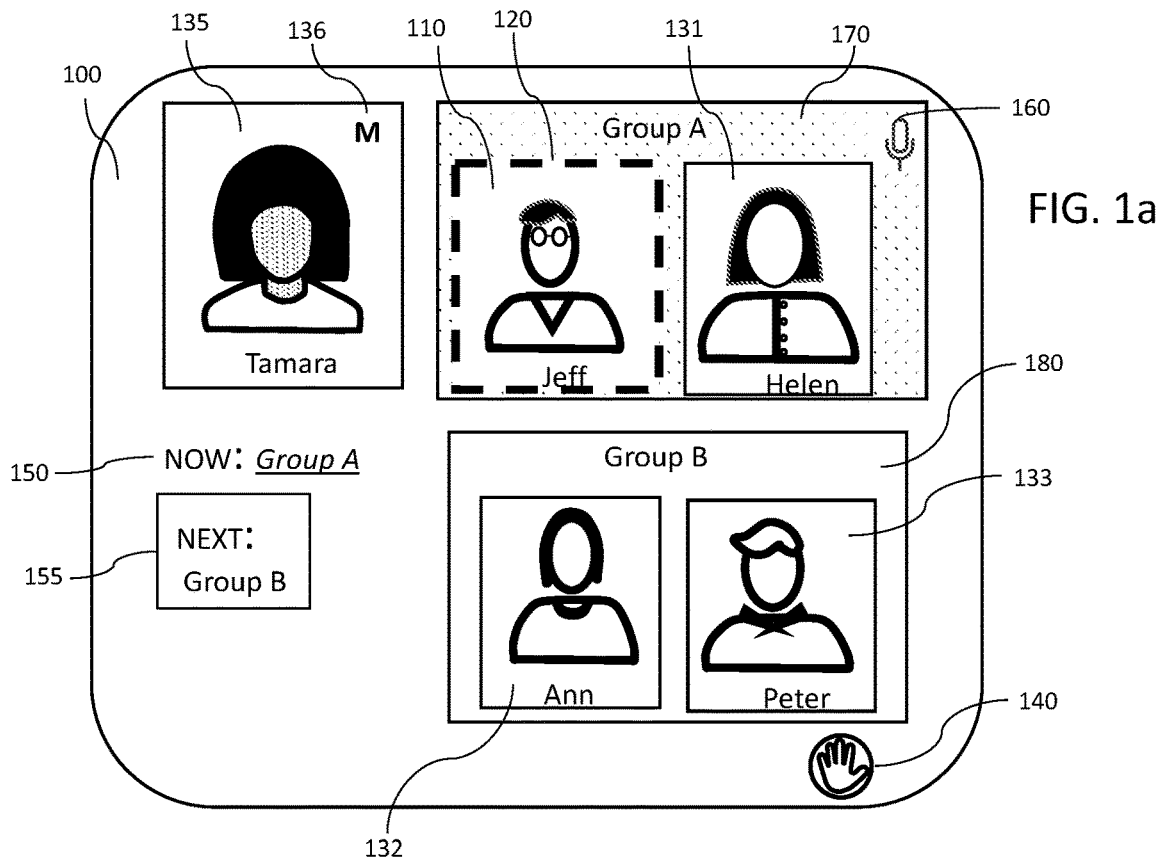
FIG. 1a shows a schematic view of an application window according to the preferred embodiment of the invention.

FIG. 1a shows window 100 from the perspective of participant 110, whose image is marked with visual cue 120. Participant 110 and participant 131 comprise a subgroup, Group A. Group A acts as a meeting participant: it requested and obtained a conversational floor for the whole subgroup, and the subgroup currently acts as a presenter. Participant 110 and participant 131, as members of Group A, are both engaged in the presentation, and both have the conversational floor; they negotiate their turns between the two of them. Area 170 is displaying images of participant 110 and participant 131. Visual cue 160 is displayed in area 170 to indicate that the subgroup of participants shown in area 170 (Group A) has the presenter floor. Area 180 is displaying images of participant 132, and participant 133. Participant 132 and participant 133 form another subgroup (Group B). Group A and Group B may be formed by manually assigning individual participants to one of the subgroups by a person having the rights to do so (such as a teacher or a meeting moderator) or by using an algorithm (e.g., random assignment). Subgroups can be also formed by participants themselves. Window 100 shows an image of participant 135 ("Tamara"), which image is marked by visual cue 136 (letter "M") indicating that the participant has the role of a moderator. Field 150 indicated the current presenter (Group A), and field 155 indicates the next presenter (Group B). Window 100 shows presenter floor request button 140. Tapping button 140 sends a presenter floor request for the subgroup of the participant (that is, Group A). The embodiment can be used, for instance, when subgroups work in breakout rooms and then reconvene for a general discussion, during which discussion each subgroup presents a report about their work.

Figure 1B:
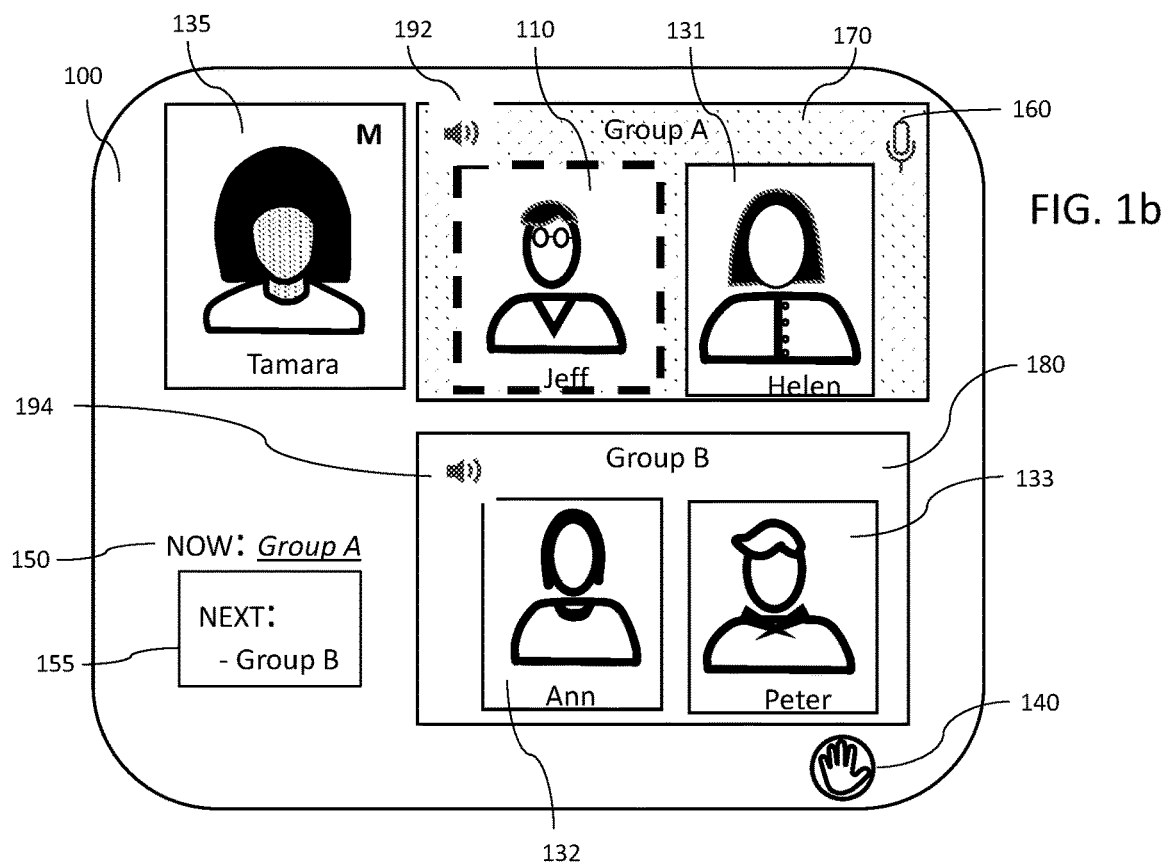
FIGS. 1b-1c show a schematic view of an application window according to a variation of the preferred embodiment of the invention.
Figure 1C:
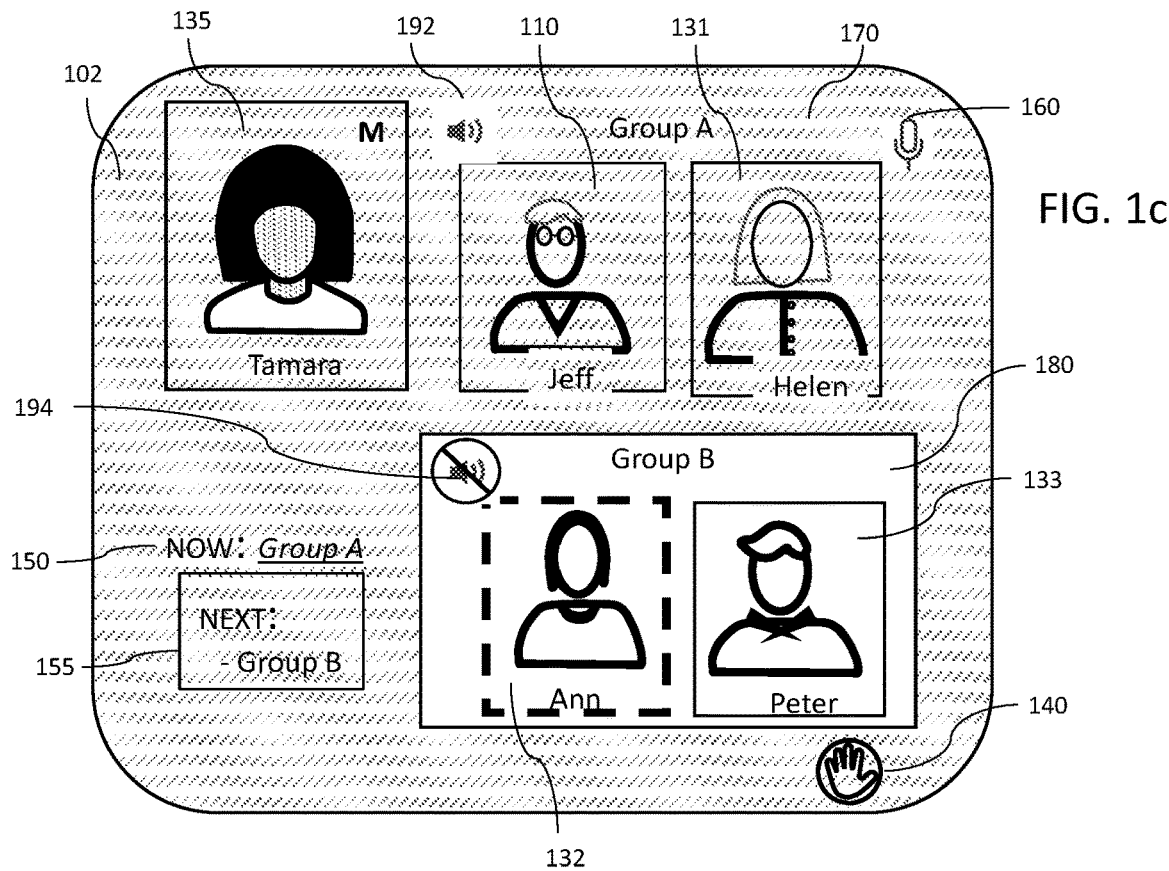

A variation of the embodiment is shown in FIG. 1b-c. While each individual participant can mute or unmute himself or herself, as well as turn their own cameras on or off (this functionality is not shown), a subgroup of participants can also mute/unmute itself as a whole subgroup. It can be done, for instance, by clicking on a speaker icon shown in the window area displaying the subgroup. FIG. 1b shows examples of such clickable icons: icon 192 displayed in area 170 of Group A, and icon 194, displayed in area 180 of Group B. FIG. 1c shows window 102, from the perspective of participant 132, at the moment when participant 132 mutes Group B by clicking on icon 194 of Group B. Icon 194 changes its appearance and how shows a "crossed over" ("canceled") speaker image, indicating that Group B is muted. In the "subgroup mute" mode the subgroup can still hear the rest of the participants in the meeting, but the rest of the participants cannot hear what Group B members are saying. The image of window 102 is changed to make area 180 visually different. Parts of window 102, different from area 180, are visually de-emphasized by "dimming", while still being visible.

Figure 1D:
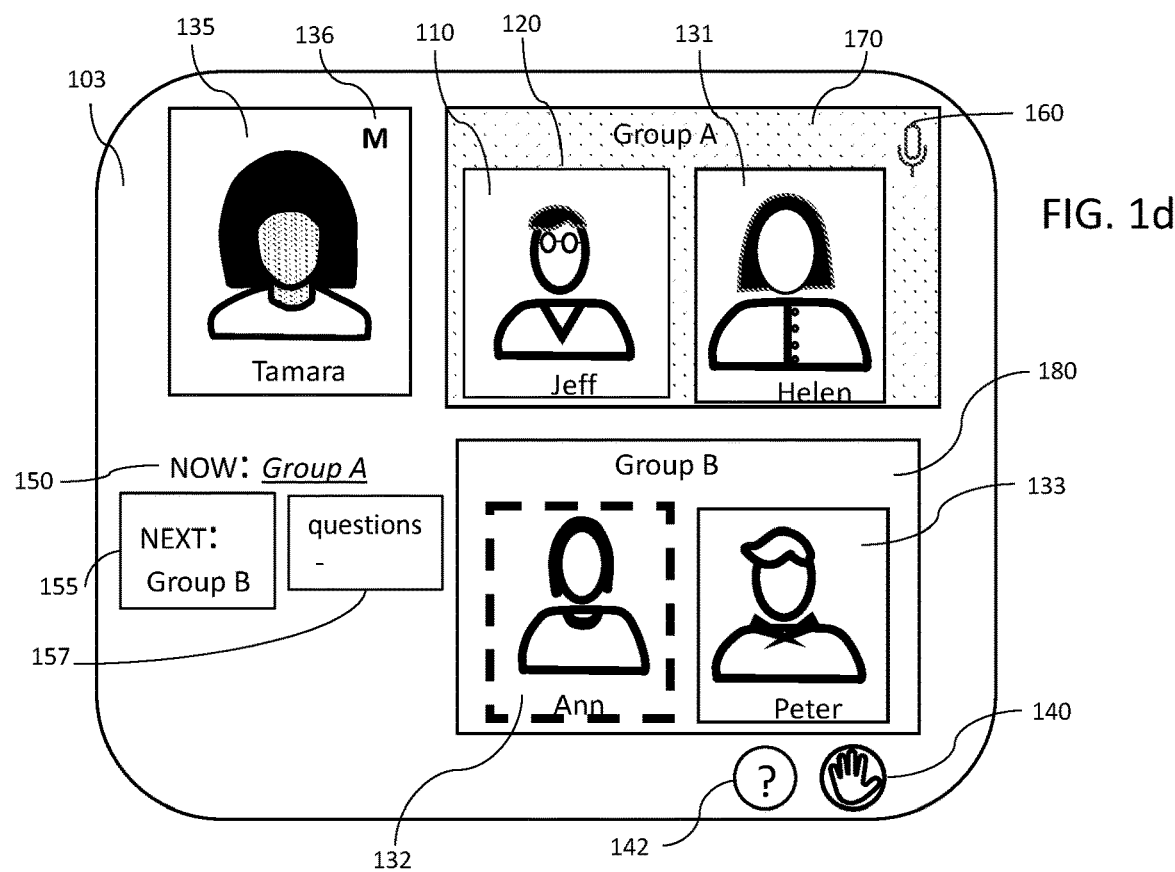
FIG. 1d shows a schematic view of an application window according to a further variation of the preferred embodiment of the invention.

A further variation of the embodiment is shown in FIG. 1d. Window 103, representing the perspective of participant 132 ("Ann") shows two waiting lists: a waiting list of presenters, displayed in field 155, and also a waiting list of commentators (currently empty), displayed in field 157. Window 103 comprises presenter floor request button 140 and also questions/comments floor request button 142. By tapping button 140 participant 132 adds her subgroup (that is, Group B) to waiting list in field 155. Tapping button 142 would add participant 132 to the waiting list of commentators, displayed in field 157 (the action is not shown in FIG. 1d).

The preferred embodiment and its variations, can be used to support persistent subgroups of meeting participants, which subgroups may preserve their identity throughout an entire meeting or even during several meetings (at the same time, if needed, the participants can be divided into different sets of subgroups on a moment-to-moment basis). For instance, when a class is divided into smaller subgroups of students, the teacher may be able to see and manage the subgroups not only during small-group discussions in "breakout rooms", but also during whole-class sessions. The teacher may be able, for instance, to view the subgroups, highlight and mute/unmute a particular subgroup, and chat with particular subgroups. Similarly, the students may be able to see what subgroup they belong to and who the members of the subgroup are—not only during breakout room sessions, but also during whole-class sessions. If subgroups of meeting participants are visually merged into larger screen objects (e.g., as Group A and Group B are each merged into its own rectangular area, respectively, area 170 and area 180, in FIG. 1), the structure of the objects may be preserved when shifting from the general discussion to small group discussions in breakout rooms and back. During small-group discussions, when each subgroup has its own private communication space, a subgroup (or its individual members) may choose to view their subgroup either in a conventional way, as having a separate online meeting (a "full screen" view of the subgroup), or as being shown as one screen object among several. An example of the latter is that during a breakout room discussion, a subgroup may view itself in a way, similar to the one, in which Group B is shown in FIG. 1c. A difference from FIG. 1c would be in how a subgroup will view other groups. To protect its privacy, a subgroup will limit the information that can be seen by others. For instance, area 180 can be displayed to other groups as a blank rectangle, or it may show some selected information, controlled by Group B (e.g., names of subgroup members, emojis, a subgroup logo, a short subgroup's status statement, an activity level indicator, etc.). Likewise, Group B would see only similarly limited information about other subgroups (e.g., Group A). Subgroups may also have their locally (within the subgroup) shared tools and materials, such as apps and files.

It is understood that the above descriptions of the preferred embodiment are examples intended to disclose the subject matter of the present invention; the descriptions are not intended as complete specifications of technological systems implementing the subject matter. A wide range of additional variations of the preferred embodiment are within the scope of the invention.

For instance, when subgroups are created, certain parameters may be specified, such as the number of subgroups, their size or sizes, names, list of individual participants to be included in a subgroup, and whether or not meeting participants are allowed to join a subgroup to themselves. Subgroup can be created either manually or automatically.

Furthermore, it is understood that a wide range of potential subgroup-directed actions that participants can potentially perform (when taking in either general discussion or a small-group discussion) is within the scope of the present invention. It includes, for instance, requesting a conversational floor for giving presentation as a subgroup, muting/unmuting a subgroup, sharing screen within a subgroup, sending messages to members of own subgroup, sending messages to other meeting participants on behalf of a subgroup. It is also understood that users having appropriate privileges can also disable a division of meeting participants, if needed.

Finally, it should be noted that specific aspects of technical implementation are left out of the descriptions to more clearly convey the teaching of the invention. In particular, it is understood that users of online meeting systems according to the present invention may be able to mute/unmute themselves, have individual accounts and define individual preferences (such as input and output volume, background image, license information, contact details, and so forth. Moderators (or hosts) of such meetings may be able to set up the date and time for a meeting and set other preferences and settings. In addition, various implementation details, such as a technology platform, window layout, visual cues used and other user interface elements can be implemented in various ways, obvious to those skilled in the art. All such variations are within the scope of the present invention.

What is claimed is:

1. A method is provided for supporting a plurality of users using a plurality of electronic devices to engage in an online meeting as meeting participants, wherein each device in said plurality of devices comprises at least a processor, a display displaying an at least a display window displaying meeting-related information, a microphone, and preferably a video camera configured to be able to capture an image of a device user, wherein said plurality of devices are connected via a communication network to one another and preferably to a network server or servers, wherein all meeting participants are taking part in a general discussion and are present in the same communication space, in which meeting participants having a conversational floor are addressing all other participants in said meeting; the method comprising the method steps of detecting a user action performed by a user from said plurality of users, said user action being a request for dividing at least some meeting participants into a set of non-overlapping subgroups according to predefined parameters included in said requesting user action; wherein said parameters include at least a parameter selected from a group comprising at least: number of subgroups, size or sizes of subgroups, names of subgroups, list of persons to be included in a subgroup, and whether or not said meeting participants can join a subgroup themselves; and displaying, in said display window, visual cues indicating which meeting participants are placed in which subgroups; and enabling meeting participants to perform at least a user action selected from a set comprising at least: requesting a conversational floor for giving presentation as a subgroup, muting/unmuting a subgroup, sharing screen within a subgroup, sending messages to members of own subgroup, sending messages to other meeting participants on behalf of a subgroup;

wherein said meeting participants, divided into said subgroups, remain in said common communication space.

2. A method as recited in claim 1, wherein visual representations of members of a subgroup are placed in a same area of said display window, and wherein said visual cues are adapted to make said window area visually distinct.

3. A method as recited in claim 1, wherein said muting of a subgroup allows members of said subgroup to talk to other members of said subgroup without being heard by meeting participants, who do not belong to said subgroup.

4. A method as recited in claim 1, further including the method steps of detecting a user action requesting a transition from said general discussion to small group discussion in said subgroups; and enabling members of a subgroup to talk to other members of said subgroup without being heard by meeting participants, who do not belong to said subgroup.

5. A method as recited in claim 4, wherein members of a subgroup are enabled to choose whether or not to share video images of subgroup members during said small group discussions.

6. A method of claim 4, wherein members of a subgroup are enabled to choose whether or not to show other groups images selected by said subgroup members.

7. A method as recited in claim 4, further including the method steps of detecting a user action requesting a transition from small group discussion in said subgroups to said general discussion; and enabling meeting participants to join said general discussion while preserving a division of said meeting participants into said set of subgroups.

8. A method as recited in claim 1, further including the method steps of detecting a user action requesting disabling said division of meeting participants into said set of subgroups; and disabling said subgroup-indicating visual cues and the possibility for said meeting participants to perform user actions enabled after detecting said user action with a request for dividing meeting participants into said set of subgroups.

9. A method as recited in claim 4, wherein members of a subgroup are enabled to choose between having or not having an overview of other subgroups as said other subgroups are engaged in small group discussions.

10. A non-transitory computer-readable medium containing instructions, which, when executed by a processor, cause a plurality of electronic devices, said plurality of electronic devices comprising devices having at least a processor, a memory storage, a display displaying at least a display window, a microphone, and preferably a video camera, said plurality of electronic devices being connected to one another and to at least a network server via a communication network, said plurality of electronic device used by a plurality of users taking part in a videoconference session as meeting participants, to perform functions of:

detecting a user action performed by a user from said plurality of users, said user action being a request for dividing at least some meeting participants into a set of non-overlapping subgroups according to predefined parameters included in said requesting user action; wherein said parameters include at least a parameter selected from a group comprising at least: number of subgroups, size or sizes of subgroups, names of subgroups, list of persons to be included in a subgroup, and whether or not said meeting participants can join a subgroup themselves; and displaying, in said display window, visual cues indicating which meeting participants are placed in which subgroups; and enabling meeting participants to perform at least a user action selected from a set comprising at least: requesting a conversational floor for giving presentation as a subgroup, muting/unmuting a subgroup, sharing screen within a subgroup, sending messages to members of own subgroup, sending messages to other meeting participants on behalf of a subgroup;

wherein said meeting participants, divided into said subgroups, remain in said common communication space.

11. The non-transitory computer-readable medium of claim 10, further containing instructions, which, when executed by a processor, cause said plurality of electronic devices to place visual representations of members of a subgroup in a same area of said display window, and wherein said visual cues are adapted to make said window area visually distinct.

12. The non-transitory computer-readable medium of claim 10, further containing instructions, which, when executed by a processor, cause said plurality of electronic devices to detect a user action requesting a transition from said general discussion to small group discussion in said subgroups; and enable members of a subgroup to talk to other members of said subgroup without being heard by meeting participants, who do not belong to said subgroup.

13. The non-transitory computer-readable medium of claim 12, further containing instructions, which, when executed by a processor, cause said plurality of electronic devices to detect a user action requesting a transition from small group discussion in said subgroups to said general discussion; and enable meeting participants to join said general discussion while preserving a division of said meeting participants into said set of subgroups.

14. The non-transitory computer-readable medium of claim 10, further containing instructions, which, when executed by a processor, cause said plurality of electronic devices to permit members of a subgroup to choose between having or not having an overview of other subgroup as said other subgroups are engaged in small group discussions.

* * * * *